(12) United States Patent
Sandoval

(10) Patent No.: US 8,473,977 B2
(45) Date of Patent: Jun. 25, 2013

(54) DYNAMIC ADVERTISEMENT COPY INSERT

(75) Inventor: Francis R Sandoval, Louisville, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 92 days.

(21) Appl. No.: 13/173,636

(22) Filed: Jun. 30, 2011

(65) Prior Publication Data

US 2013/0007799 A1    Jan. 3, 2013

(51) Int. Cl.
*H04N 7/025* (2006.01)
*H04N 7/10* (2006.01)

(52) U.S. Cl.
USPC .............................. 725/32; 725/36

(58) Field of Classification Search
USPC ............................... 725/32, 34–36
See application file for complete search history.

(56) References Cited

U.S. PATENT DOCUMENTS

| | | | |
|---|---|---|---|
| 2004/0003397 A1* | 1/2004 | Boston et al. | 725/34 |
| 2007/0157231 A1* | 7/2007 | Eldering et al. | 725/35 |
| 2008/0059312 A1* | 3/2008 | Gern et al. | 705/14 |
| 2009/0007171 A1* | 1/2009 | Casey et al. | 725/34 |
| 2009/0031359 A1* | 1/2009 | Kidd et al. | 725/61 |

* cited by examiner

*Primary Examiner* — Mulugeta Mengesha
(74) *Attorney, Agent, or Firm* — Great Lakes Intellectual Property, PLLC.

(57) ABSTRACT

A method of dynamic advertisement insertion is disclosed where an essentially limitless number of non-staged, unbound advertisement advertisements are made available for advertisement insertion. The dynamic advertisement insertion may include the use of stage, bound advertisements so as to permit dynamic insertion of staged and non-staged advertisements.

16 Claims, 3 Drawing Sheets

DYNAMIC ADVERTISEMENT COPY INSERT

TECHNICAL FIELD

The present invention relates to dynamic advertisement copy insertion where advertisements stored at remote locations, or locations unbound to a service provider of media during which the advertisements may be inserted, are made available for insertion.

BACKGROUND

Real-time advertisement placement, commonly referred to as dynamic advertisement insertion, corresponds with the insertion of selectable advertisements during play of media content, such as insertion of commercials or other advertisements (pop-up ads, interactive messaging, etc.) during television programs. The advertisements may be selected for insertion in real-time or dynamically as the media is being played according to the content of the media, a user viewing the program, a time of day, and any number of other parameters. The advertisements made available for selection and subsequent insertion, however, are limited to advertisement staged for insertion, or so called staged advertisements.

Staged advertising correspond with advertisements pre-formatted and/or pre-stored at the output device and/or the media content source, e.g., a server or headend, for insertion during play. The number of advertisements that can be staged in this manner is relatively limited in that only a selected number of advertisements can be stage in advance of playing the media content due storage and processing limitations of the output device and/or media content source. While the media content source may be able to stage more advertisements than a relatively less capable output device, the media source is still tasked with staging advertisement for a much larger number of users, which effectively limits the number of advertisements that can be staged.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
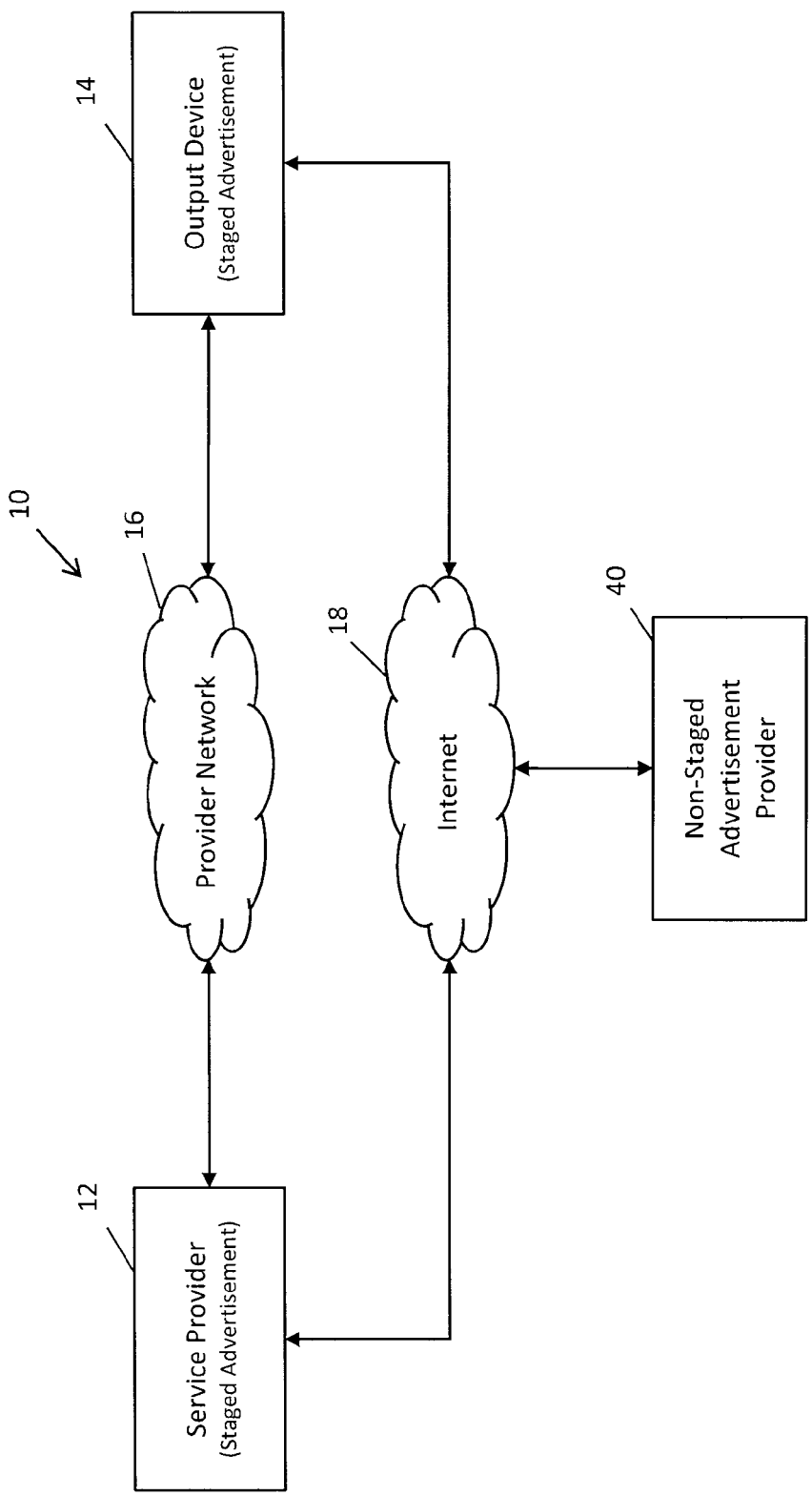
FIG. 1 illustrates a dynamic advertisement copy system as contemplated by one non-limiting aspect of the present invention.

FIG. 1 illustrates a dynamic advertisement copy system 10 as contemplated by one non-limiting aspect of the present invention. The system 10 is described with respect to a service provider 12 being operable to provide media content related signaling to an output device 14 in order to facilitate play of media content and the dynamic insertion of advertisement during media play. The present invention is predominately described with respect to the service provider 12 being a cable, satellite, or broadcast service provider having capabilities to support linear (broadcast, switched digital video (SDV), etc.) and non-linear (video on-demand (VOD), a la carte, etc.) modes of delivering television related services and programming to the output device 14. The service provider 12, however, may be any type of provider capable of sourcing media, such as but not limited to a high speed data service provider, a telephony service provider (wireline, wireless, VoIP, cellular), a server, and the like.

The output device 14 is predominately described with respect to being a settop box (STB) or television operable to process television related media content for user viewing. The output device 14, however, can be any suitable device capable of interfacing media with a user, such as but not limited to a computer (laptop, tablet, desktop), personal digital assistant (PDA), media terminal adapter (MTA), mobile phone (VoIP, cellular), and the like. Moreover, the output device 14 and/or the service provider 12 is not necessarily intended to be limited to any particular type of media content as the present invention fully contemplates supporting play of any type of media content, such as but not limited to television programs and audio programs, and in some cases, gaming, interactive television electronic programming guides (EPGs) and other applications/signaling associated with services and/or activities during which advertisements may be dynamically inserted.

The service provider 12 may be configured to communication with the output device over in-band and out-of-band (OOB) signal delivery systems, which for exemplary purposes are shown respectively to correspond with a service provider proprietary network 16 and the Internet 18. While the Internet 18 and provider network 16 may be supported with the use of common devices and/or infrastructure, e.g., headend, cable modem termination system (CMTS), etc., the networks 16, 18 are shown to be separate in order to distinguish the types of signaling traffic and/or the interface of the output device 14 needed to support communications over the same. The in-band signaling, for example, may take place over a quadrature amplitude modulated (QAM) channel having video/audio data transmitted according to Moving Pictures Expert Groups (MPEG), and the out-of-band signaling may be Internet Protocol (IP) packet-switched type signaling.

Figure 2:
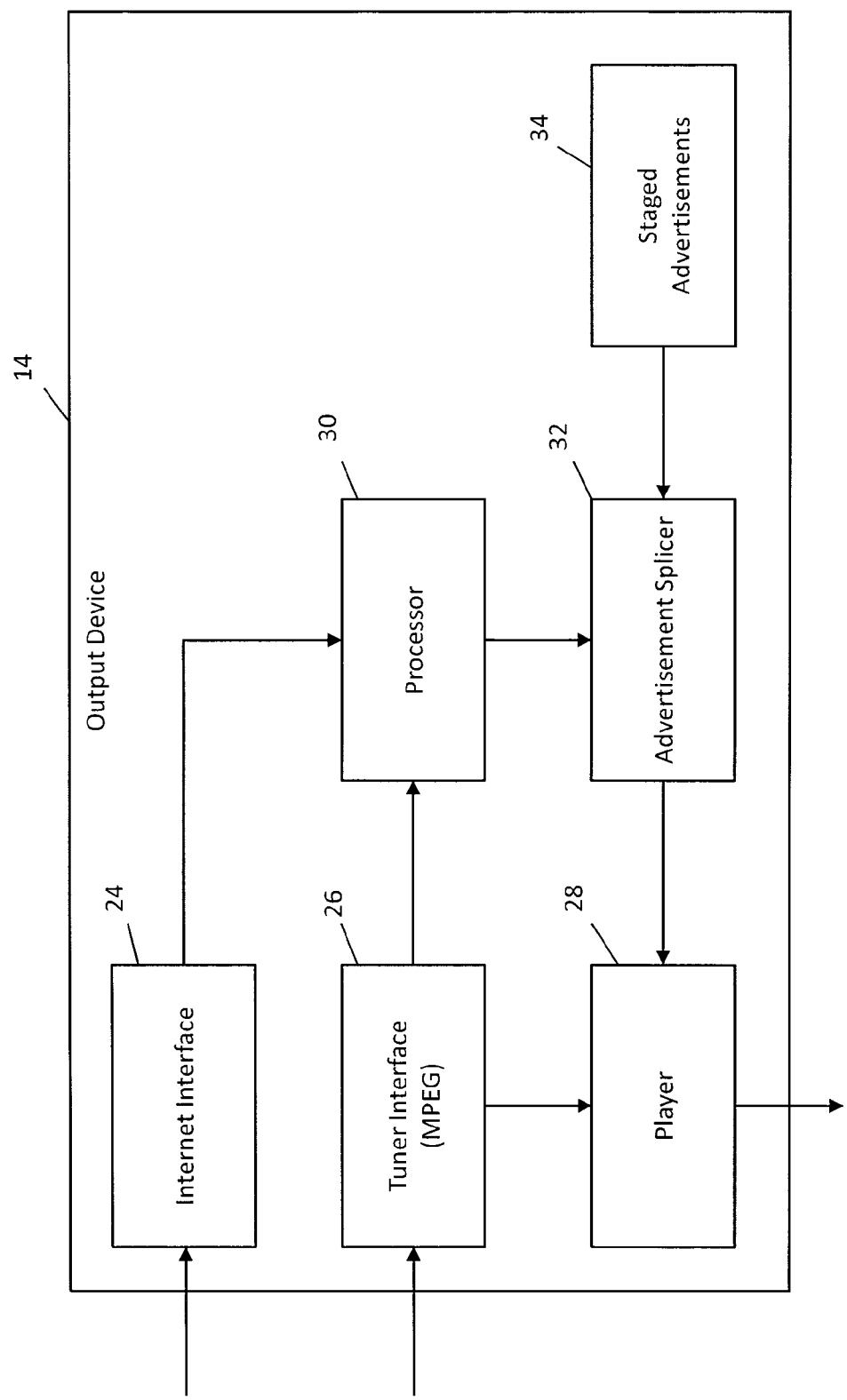
FIG. 2 illustrates the output device as contemplated by one non-limiting aspect of the present invention.

FIG. 2 illustrates the output device 14 as contemplated by one non-limiting aspect of the present invention. The output device 14 may include an Internet interface 24, such as a port operable to connect by wire to a router or an antenna operable to connect wirelessly to a router. The output device 14 may include a tuner interface 26, such as a decoder operable to tune to a particular television channel and to decode an associated MPEG transport stream. While the present invention fully contemplates IP delivery of media content, and in particular television channels, this exemplary configuration demonstrates one type of configuration where television channels can be delivered through separate interfaces 24, 26 according to in-band signaling (tuner interface) and OOB signaling (Internet interface). In the case of television programming, the audio and video may be delivered to a player 28 for output. Audio and video received through the Internet interface 24 may be processed with a processor 30 prior to output to the player 28 whereas audio and video carried in a television channel may decoded for direct output to the player 28. Some data carried within the MPEG stream may be output to the processor 30, such as to facilitate dynamic advertisement insertion.

The processor 30 may be associated with a computer-readable medium having stored thereon a plurality of instructions including instructions which cause the processor to facilitate dynamic advertisement insertion. The dynamic advertisement insertion may be facilitated with an advertisement splicer 32. The advertisement splicer 32 may be configured to facilitate inserting advertisement during advertisement avails specified with the media content, such as by replacing an embedded advertisement (advertisement included as part of video) with a dynamically inserted advertisement. The dynamically inserted advertisement may take many forms, including a complete replacement of the embedded advertisement, an overlaid pop-up advertisement, an interactive message/highlight, and a banner advertisement. In the event the advertisement is being showing in webpage or through some other interface, the advertisement splicer 32 may be a user agent or some other feature operable to interface the advertisement with an executing application in order to facilitate insertion of the dynamically selected advertisement.

The dynamic advertisement insertion application may be configured to evaluate any number of parameters to determine the appropriate advertisement for insertion. As described in more detail below, the present invention contemplates dynamic insertion of "staged" or "non-staged" advertisements and intends to draw a distinction between these types of advertisements. In general, the "staged" advertisements correspond with advertisement copy pre-stored at one or both of the service provider 12 and output device 14, and the "non-staged" advertisement corresponds with advertisement copy stored remotely from the service provider 12 and output device 14.

In the case of staged advertisements, advertisements available for insertion may be selected from a limited or bound list of advertisements identified prior to play of the media content (the selection may take place after play with the list being determined before play). The available staged advertisement may be stored at the service provider 12 and/or at the output device 14 within a staged advertisement database 34. In the case of non-staged advertisements, a listing of available advertisements may not be available to facilitate selection given the unbound and limitless nature of non-staged advertisements. The non-staged advertisements differ from the staged advertisements in that they may not be pre-assigned for insertion prior to play of media content and their availability may change over time, i.e., the available non-staged advertisements may dynamically change over time, and even during play of the media content, as advertisers are registered and de-registered.

The advertisement selected for insertion may be facilitated with issuance of a non-staged advertisement request to a non-stage advertisement provider 40 (see FIG. 1). The non-staged advertisement provider 40 may be a media indexing system configured to facilitate inserting advertisements available from virtually any device and location capable of transmitting advertisements over the Internet 18 or through some other network (e.g., cellular) to the insertion device (e.g., the service provider 12 and/or the output device 14). The non-staged advertisement provider 40 is shown to be a single entity for exemplary purposes as multiple entities may be utilized to provide the desired indexing. The present invention contemplates a limitless and unbound scenario where advertisers rely on the non-stage advertisement provider 40 to register their advertisements and facilitate advertisement delivery for desired insertion. An infinite number of advertisers can index their advertisements for insertion without having to store the advertisements at the non-staged advertisement provider 40 or the service provider/output device 12, 14. While the non-stage advertisement provider 40 may store some of the non-staged advertisement, the non-staged advertisement provider may instead store instructions or addresses of the non-stage advertisement advertisers from which the advertisement may be retrieved.

The non-staged advertisement provider 40 may include an algorithm of other means for identifying an appropriate advertisement for insertion based on the infinite number of non-staged advertisements identified with the indexing system. Optionally, the advertisers registering with the non-staged advertisement provider 40 may be required to provider advertisement metadata with each indexed advertisement. The non-staged advertisement provider 40 may organize the advertisement metadata into searchable metadata to facilitate correlating the available non-staged advertisements with the particular needs of the service provider 12 and/or the output device 14 requesting non-staged advertisement insertion. The correlation may be based, at least in part, on advertisement request metadata included within the non-staged advertisement request issued from the service provider and/or output device 12, 14.

The use of the insertion device 12, 14 to query the non-staged advertisement provider 40 may be beneficial in ameliorating the processing demands on the insertion device 12, 14. The insertion device 12, 14 no longer needs to store the inserted advertisement prior to beginning media play (in some cases it may beneficial to deliver the non-staged advertisement earlier) and the insertion device 12, 14 no longer needs to the select the advertisement for insertion from a listing of available advertisements. The non-staged advertisement provider 40 may be configured to determine the inserted advertisement and to facilitate delivery of the advertisement to the insertion device 12, 14 through direct delivery, instructions to the corresponding advertisers to transmit the advertisement to the insertion device, and/or instructions to the insertion device to contact the advertiser to coordinate advertisement transmission.

The power of this type of indexing system may be to quickly resolve queries into an ordered set of content matches so that delivery of the non-staged advertisement can be quickly executed, such as to facilitate delivery while the media content is playing and so that the insertion device 12, 14 need only store the non-stage advertisement for a period of time to stage the advertisement for insertion, e.g., with RAM or some other temporary/volatile registry. The searchable metadata or metadata used to facilitate advertisement correlations may be vast, and as such, the present invention is not necessarily limited to any particular set of metadata and contemplates a process where the metadata develops over time to permit insertion device queries having virtually any type of metadata specified, i.e., the number of available non-staged advertisement may be so extensive that at least one of the non-staged advertisement is likely to match any type of metadata query. Of course, the present invention fully contemplates developing a standard to facilitate the same, which may be helpful in deploying the system and assurance early compliance and operability.

The searchable advertisement metadata may be extended over time, but a core set of fields might include: Content Identifier (could be Entertainment Identifier Registry (EIDR)); Content Provider ID (could be web domain name);

Content Title: (i.e., Coke #999); Window: effective start/stop window; Pricing: e.g. Cost Per Mile (CPM); Demographic: age, income, gender; and Genre. A query can include values and weighting to allow the indexing of the non-staged advertisement provider to rank potential matches and return an ordered list of matches based on rank. Rather than returning a listing to the insertion device 12, 14 to select the inserted advertisement, the non-staged advertisement provider 40 may select the inserted advertisement.

In either event, a query might specify that the CPM of an ad is the only relevant attribute: Pricing: weighting=100. As another example, a query might indicate that while pricing is important, demographics are also important. Such a request might look like this: Pricing: weighting=50; Age: value=25-50, weighting=25; Gender: value=male, and weighting=25. The matching algorithm may be expressed in pseudo-code as follows:

```
For ( i = 0; i < content entries; i++)
    Content Rank[i] = 0;
    For (n = 0; n < query metadata items; n++)
        If (content entries[i].metadata item[n] = query metadata item[n])
            Content Rank[i] += query ranking
Return( Sort(Content Rank[ ]) );
```

The present invention contemplates use of this type of indexing and metadata based advertisement matching in order to expand dynamic advertisement to include non-staged advertisement. This type of advertisement decision systems, or in the case of inserting application to other media applications such as general search and navigation, or content recommendations, may prove to optimally effective if it can operate on a practically infinite number of media assets. The non-staged advertisement provider 40, or another similarly configured application or entity, can provide a means to resolve content queries from such applications against an open ended set of media assets. Optionally, the categorization of non-stage advertisement metadata may include a search engine type of feature operable to crawl the Web to catalog non-staged advertisement so that search terms within an advertisement request can achieve results that match with specific media assets.

Since media assets (non-staged advertisements, applications, etc.) residing within private content stores may not be amenable to being automatically cataloged by non-affiliated entities, the webpage liking indexing contemplated by the present invention can allow non-staged advertisements to be found and cataloged by anyone willing to write software to do so. In this aspect of the present invention, the non-staged advertisement provider 40 may rely upon the willingness of media asset holders to publish metadata, provide open interfaces, or otherwise enable the system to become aware of the media assets. While the present invention provides multiple, scalable techniques for indexing non-stage advertisements, the non-stage advertisements may be in constant flux with advertisers constantly registering and de-registering themselves. Accordingly, some rules or verifications may be added to insure matched non-staged advertisement are likely to still be available from the time of correlation to the time of insertion, even though that time period may be brief.

Figure 3:
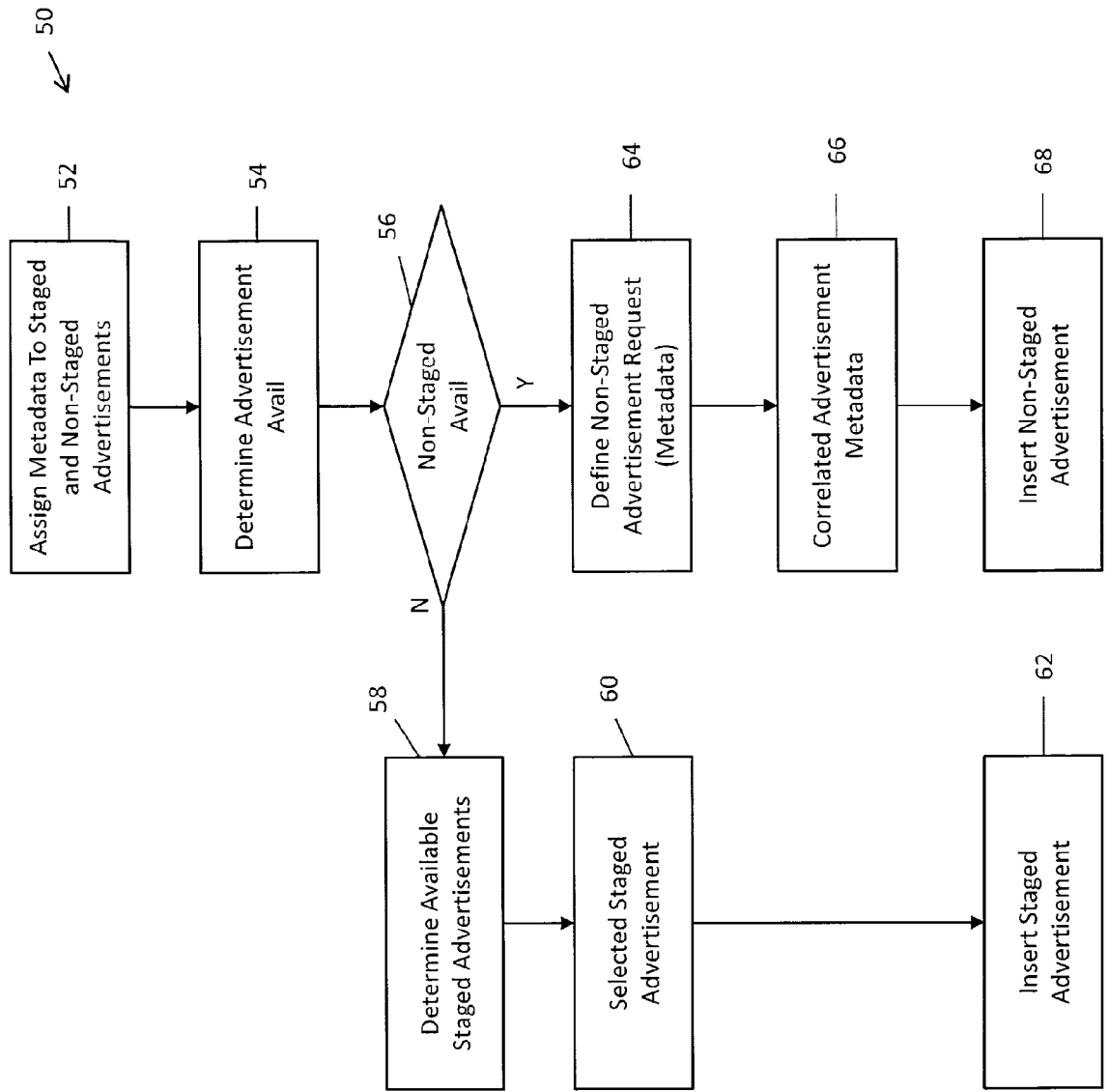
FIG. 3 illustrates a flowchart of a method of facilitating dynamic advertisement as contemplated by one non-limiting aspect of the present invention.

FIG. 3 illustrates a flowchart 50 of a method of facilitating dynamic advertisement as contemplated by one non-limiting aspect of the present invention. Block 52 relates to assigning metadata to staged and non-staged advertisements. While the staged advertisements are pre-stored and known, some metadata may be required to facilitate selection, such as if multiple staged advertisements are available for the same avail. The non-staged advertisement, in contrast, may be constantly in flux such that new metadata may need to be assigned and re-assigned depending on the available non-staged advertisements. Optionally, if the number of non-staged advertisements are limited on a user-by-user basis or according to a standard metadata reporting scheme is used, the assignment of the metadata may include reporting the available metadata the insertion device 12, 14 for use in generation the non-staged advertisement request (such reporting may not be possible if the report were to try to identify all the of infinite metadata of each available non-staged advertisement).

Block 54 relates to determining an advertisement avail. The advertisement avail corresponds with a portion of the media content during which the media content has been formatting to include use of an advertisement or a point in which event triggers or markers notify the processor 30 of events for during which an advertisement may be used. While the avail may mark traditional interruptions in the media content during which the advertisement may be shown (e.g., a commercial break), the avail may also signify a time to execute an application, such as one associated with interactive advertising during interactive television, interactive game, and webpage viewing. Block 56 relates to determining whether the identified avail is for a staged or a non-staged advertisement. While the present invention fully contemplates dynamic advertisement insertion that relies solely on non-staged advertisements, there may be some situations in which stage advertisements are desired.

A staged advertisement may be desired, for example, if a media content owner has purchased exclusive advertising rights to a particular piece of content or some other right where the purchasing advertiser is guaranteed insertion of a certain number of advertisements. Block 58 is reached in the event the staged avail is determined so that an assessment can be made to determine the staged advertisement to be inserted. The staged advertisement may be determined from a listing of available staged advertisements used to identify staged advertisements previously stored at the service provider 12 and/or the output device 14 (e.g., database 34) or in some other manner where the insertion device 12, 14 is instructed of the advertisement to be inserted during the corresponding avail. This dictation of the staged advertisement to be inserted may be beneficial with media content having embedded advertisements which are desired for preemption with a staged advertisement.

Block 60 relates to selecting the staged advertisement for insertion. This may include the service provider 12 and/or the output device 14 selecting the staged advertisement based on the listing of available advertisements or the locally stored advertisements. An assessment of the viewer, content of the media program, and other parameters may be used to arbitrate between available advertisements if multiple advertisements were determined to be available in Block 58. The selected staged advertisement is then inserted in Block 62. The insertion process may take place at the service provider 12, such as with a headend device inserting the staged advertisement within corresponding signaling sent to the output device, and/or at the output device 14 with the splicer 32 of the output device implementing a similar insertion operation. Optionally, the output device 14 and/or the service provider 12 may be required to transmit the staged advertisement to the other in the event the staged advertisement is not locally stored at the location where insertion is to take place (e.g., at the headend or at the splicer 34).

Returning to Block 56, in the event the advertisement avail specified insertion of a non-staged advertisement, the output device 14 may be required to define a non-staged advertisement request to include metadata to be used by the non-staged advertisement provider 40 in finding a suitable non-stage advertisement. The service provider 12 may also define the advertisement request and/or add or amend information included in the request. The service provider 12 may be enabled in this manner to override an advertisement request from the output device and to add information to the request that may not be available or known to the output device 14.

Block 66 relates to the non-staged advertisement provider 40 correlating the metadata within the advertisement request with the indexed advertisement. As noted above, this may include some assessment on weighted values assigned to certain pieces of metadata and the use of other techniques to help narrow down the choices of non-staged advertisements made available to the insertion device (e.g., the headend or the splicer). To further limit insertion device processing, the non-staged advertisement provider 40 may select the non-stage advertisement for the insertion device 12, 14. This may be helpful in limiting processing demands of the insertion device and the elimination of further signaling between the insertion device 12, 14 and the non-staged advertisement provider 40, i.e., to signaling that otherwise would be needed to communicate the non-staged advertisement choices to the insertion device 12, 14 and to identify the selected one of the non-staged advertisements.

Block 68 relates to inserting the desired non-staged advertisement. The non-staged advertisement may be inserted in a similar manner to the staged advertisement inserted in Block 62. The insertion of the non-staged advertisement may, however, include additional requirements since the non-staged advertisement is unlikely to be stored locally at the insertion device (it is possible that the non-staged advertisement could be stored locally). These additional requirements may relate to the transmission of the non-staged advertisement to the insertion device. Because the advertisement is not staged, its delivery may not begin until after the output device begins play of the media content, i.e., after the output device 14 becomes aware to the metadata to be included in the non-staged advertisement request. Once the non-staged advertisement is determined, additional processing may be required to time its delivery and transport to the insertion device 12, 14 in order to insure it is properly inserted. The non-staged advertisement transmission may occur in real-time to the avail and/or at some early point if temporary storage is available or additional processing time is needed at the insertion device to prepare for insertion of the non-staged advertisement.

As supported above, the present invention contemplates a real-time ad placement decisions that is not limited to placing ad copy that has been 'staged' within the cable system. The present invention provides a means of transporting ad copy from an arbitrary source at the time of the placement decision. The present invention may be used to broaden a service provider's ability to place advertisements to include new linear video delivery modes, such as SDV, as well as non-linear modes such as nDVR and VOD. Along with these additional capabilities is the ability to make real-time decisions on which ads to place within a given context while still allowing some decisions, if desired, to be based upon a pre-set schedule that is prepared some time in advance of the placement operation.

Standardized SCTE J30-based and other, proprietary, systems may be adapted in accordance with the present invention to enable multiple ad decisions systems (ADS) to take part in the ad placement process, including allowing a party external to a service provider to implement an ADS; for instance, a content owner may be enabled to make real-time decisions about what ads get placed into their content. In is manner, ad placement decisions may not necessarily be limited to the ads that have previously been 'staged' within a cable system, i.e., making the choice of what ad copy to stage within cable systems well in advance of making the real-time decision of which of the staged ads to place within a given context. By not limiting the decision the ADS can make, the present invention therefore achieves optimal valuation of any given placement.

The present invention describes a process and technology to enable the transfer of ad copy to a cable system at the time a placement decision is made. This widens the degree of freedom of the ADS to the widest possible degree, as ad copy could theoretically be acquired from any source. Staging of ad copy could also be facilitated through the same mechanism.

The dynamic ad copy transport technology may include the following elements:

A content encoding specification implemented by both ad copy supplies and cable systems. This is an agreed upon set of video formats that can be shared by the two entities.

A real-time media content transport protocol implemented by both ad copy suppliers and cable systems. This is an agreed upon mechanism to transfer video content to a cable system.

Messaging protocols to enable an ADS to instruct a cable system to request media from an ad copy supplier.

Messaging protocols to enable an ADS to discover ad copy available from ad copy suppliers. This could take the form of ad copy suppliers registering their ad copy libraries into a centralized or virtual repository.

The dynamic ad copy transport process may include:

1. ADS, ad copy supplier, and cable system are configured to support the technology components listed above.

2. ADS discovers available ad copy. May stage copy on cable system.

3. Cable system alerts ADS of placement opportunity

4. ADS provides cable system with reference to ad copy

5. Cable system and ad copy supplier engage in protocols to transport copy and place it into media context.

By avoiding staging of ad copy, the possible copy that may be placed within a given context is greatly expanded. This leads to a greater valuation of ad inventory, as more appropriate ads can be placed in a given context, allowing a premium to be charged for the placement. New algorithms for ad placement decisions can be developed to further optimize ad inventory; for instance, the integration between cable system, ADS, and ad copy supplier is loosened by avoiding the staging process, thereby allowing more real-time decision making, such as just-in-time auctioning off of cable inventory to copy suppliers by the ADS.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of facilitating dynamic insertion of non-staged advertisements during play of a media program transported to an output device from a headend, the non-staged advertisements being an unbound plurality of advertisements stored remotely from the output device and the headend and previously unassigned as candidates for insertion during certain avails of the media program, the method comprising:

assigning advertisement metadata to each non-staged advertisement;

defining a non-staged advertisement request comprised of advertisement metadata;

determining at least one non-staged advertisement avail within the media program;

after the output device begins play of the media program and prior to occurrence of the at least one non-staged avail, selecting one or more of the non-staged advertisements based on the advertisement metadata in the non-staged advertisement request, the selected one of the non-staged advertisements being selected from the plurality of non-staged advertisements correlating with the advertisement metadata;

facilitating transport of the selected one of the non-staged advertisements from a remote location to the headend, and thereafter, transmitting the selected one of the non-staged advertisements from the headend to the output device for insertion during the at least one non-staged avail;

facilitating dynamic insertion of staged advertisements during playback of the media program, the staged advertisements being a bound number of advertisements previously assigned as candidates for insertion during certain avails in the media program;

storing the staged advertisements at the headend prior to beginning playback of the media program at the output device;

determining least one staged avail within the media program;

after the output device begins playback of the media program and prior to occurrence of the at least one staged avail, determining selection of one of the staged advertisements for insertion during the at least one staged avail;

transmitting the selected one of the staged advertisements from the storing one of the headend to the output device for insertion during the at least one staged avail; and transmitting the at least one staged advertisement and the at least one non-stage advertisement to the output device such that the output device inserts each of the staged and non-stage advertisements over advertisements embedded within the media program for the corresponding staged and non-stage avails.

2. The method of claim 1 further comprising facilitating transport of the selected one of the non-staged advertisements to the headend over the Internet and facilitating transport of the non-staged and staged advertisements from the headend to the output device through in-band signaling.

3. A method of facilitating dynamic insertion of non-staged advertisements during play of a media program transported to an output device from a headend, the non-staged advertisements being an unbound plurality of advertisements stored remotely from the output device and the headend and previously unassigned as candidates for insertion during certain avails of the media program, the method comprising:

assigning advertisement metadata to each non-staged advertisement;

defining a non-staged advertisement request comprised of advertisement metadata;

determining at least one non-staged advertisement avail within the media program;

after the output device begins play of the media program and prior to occurrence of the at least one non-staged avail, selecting one or more of the non-staged advertisements based on the advertisement metadata in the non-staged advertisement request, the selected one of the non-staged advertisements being selected from the plurality of non-staged advertisements correlating with the advertisement metadata;

facilitating transport of the selected one of the non-staged advertisements from a remote location to the headend, and thereafter, transmitting the selected one of the non-staged advertisements from the headend to the output device for insertion during the at least one non-staged avail;

facilitating transport of the selected one of the non-staged advertisements to the headend over the Internet and facilitating transport of the non-staged and staged advertisements from the headend to the output device through in-band signaling; and wherein the output device issues the non-staged advertisement request over the Internet to an advertising entity hosting a dynamic advertisement insertion application, the advertising entity then facilitating transport of the selected one of the non-staged advertisements over the Internet to the headend for subsequent in-band transport to the output device.

4. The method of claim 3 comprising the advertisement metadata including:

an Entertainment Identifier Registry (EIDR) identifier of the media program;

a provider identifier that identifies a source of the media program;

a duration value that identifies a length of the at least one non-staged avail;

a pricing value that indicates a cost to advertise during the at least one non-staged avail; and at least one of a user age, income, and gender.

5. The method of claim 3 further comprising selecting the one of the plurality of non-staged advertisements having the greatest correlation with the advertisement metadata.

6. The method of claim 3 further comprising randomly selecting the one of the plurality of non-staged advertisements from a correlating grouping of non-staged advertisements having related advertisement metadata.

7. The method of claim 3 further comprising correlating the non-staged advertisement based at least in part on weighted values assigned to two or more of the advertisement metadatas, the weighted values reflecting an importance of the corresponding metadata to be correlated.

8. A method of facilitating dynamic insertion of staged and non-staged advertisements during play of a media program at an output device, the staged advertisements being a plurality of advertisements previously assigned as candidates for insertion during certain avails in the media program and stored at least one of the headend and the output device prior to play of the media program, the non-staged advertisements being a plurality of advertisements previously unassigned as candidates for insertion during certain avails of the media program and stored remotely from the headend and the output device prior to play of the media program, the method comprising:

determining least one staged avail within the media program;

determining selection of one of the staged advertisements for insertion during the at least one staged avail;

facilitating transmission of the selected one of the staged advertisements to the output device for insertion during the at least one staged avail;

determining at least one non-staged avail within the media program;

determining selection of one of the non-staged advertisements for insertion during the at least one non-staged avail;

facilitating transmission of the selected one of the non-staged advertisements to the output device for insertion during the at least one non-staged avail;

the number comprising the plurality of staged advertisements remaining fixed during playback of the media program; and the number comprising the plurality of non-staged advertisement changing during playback of the media program.

9. The method of claim 8 further comprising:

facilitating transmission of the selected one of the staged advertisements from the headend device to the output device; and facilitating transmission of the selected one of the non-staged advertisement from an advertising entity to the output device, the advertising entity being remotely located from the headend device.

10. The method of claim 9 further comprising:

facilitating transmission of the selected one of the staged advertisements through in-band signaling; and facilitating transmission of the selected one of the non-staged advertisements through out-of-band signaling.

11. The method of claim 10 wherein the out-of-band signaling is transported over the Internet.

12. A method of facilitating dynamic insertion of advertisements during play of a media program at an output device, the method comprising:

implementing a registration process to dynamically identify advertisements available for insertion, the dynamic registration process dynamically adding and removing advertisements available for insertion as a function of advertisement registrations and de-registrations;

associating searchable metadata with each of the available advertisements;

upon receipt of an advertisement query that identifies advertisement metadata corresponding with the searchable metadata, identifying a subset of the available advertisements to be candidates for advertisement insertion, the subset of the available advertisement being those that best match with the advertisement metadata; and upon receipt of an advertisement selection message that identifies a selected one of the subset of the available advertisements, facilitating insertion of the selected one of the subset of the available advertisements during playback of the media program at the output device, identifying whether the selected one of the subset of advertisements is one of a staged advertisement and a non-staged advertisements, the staged advertisement being one of stored at a server that streams the media program to the output device and stored at the output device, the non-staged advertisement being stored remotely from the server and the output device; and facilitating transport of the staged advertisements to the output device with in-band signaling and a transport of the non-staged advertisements to the output device with out-of-band signaling.

13. The method of claim 12 further comprising identifying the subset of the available advertisements as a function of weighted values assigned to one or more pieces of the advertisement metadata.

14. The method of claim 12 further comprising facilitating transport of the advertisement selection message from the output device, the output device one of randomly selecting the selected one of the advertisements from the subset of the available advertisements and selecting the selected one of the advertisement from a ranking of the subset of the available advertisements.

15. The method of claim 12 further comprising receiving the advertisement query and the advertisement selection message from the output device.

16. The method of claim 12 further comprising receiving the advertisement query and the advertisement selection message from a headend used to source the media program to the output device.

* * * * *